United States Patent
Haeger et al.

(10) Patent No.: US 9,137,222 B2
(45) Date of Patent: Sep. 15, 2015

(54) CRYPTO PROXY FOR CLOUD STORAGE SERVICES

(71) Applicant: VMware, Inc., Palo Alto, CA (US)

(72) Inventors: Edward Scarlett Haeger, Park City, UT (US); Karl Schurig, Lehi, WA (US); Michael Cenname, Seattle, WA (US); Steve Elliott, Renton, WA (US); Andrew Skowronski, Hudson (CA)

(73) Assignees: VMware, Inc., Palo Alto, CA (US); Decho Corporation, Seattle, WA (US)

( * ) Notice: Subject to any disclaimer, the term of this patent is extended or adjusted under 35 U.S.C. 154(b) by 149 days.

(21) Appl. No.: 13/665,651

(22) Filed: Oct. 31, 2012

(65) Prior Publication Data

US 2014/0122866 A1 May 1, 2014

(51) Int. Cl.
*H04L 29/06* (2006.01)
*H04L 29/08* (2006.01)

(52) U.S. Cl.
CPC .......... *H04L 63/0471* (2013.01); *H04L 63/061* (2013.01); *H04L 67/10* (2013.01)

(58) Field of Classification Search
USPC .......................................... 713/153
See application file for complete search history.

(56) References Cited

U.S. PATENT DOCUMENTS

| 8,566,578 | B1* | 10/2013 | Banerjee ............... 713/153 |
| 2008/0083036 | A1* | 4/2008 | Ozzie et al. .............. 726/27 |
| 2010/0235543 | A1* | 9/2010 | Gmuender et al. ........ 709/246 |
| 2010/0332401 | A1* | 12/2010 | Prahlad et al. ............. 705/80 |
| 2012/0179909 | A1* | 7/2012 | Sagi et al. ................ 713/167 |

* cited by examiner

*Primary Examiner* — Devin Almeida (57) ABSTRACT

In one embodiment, a proxy receives, from a client node, a file to be stored by a cloud storage server, where the proxy and the client node are part of a private network that does not include the cloud storage server. The proxy retrieves an encryption key associated with a user of the client node and encrypts the file using the encryption key. The proxy then transmits the encrypted file to the cloud storage server.

21 Claims, 6 Drawing Sheets

CRYPTO PROXY FOR CLOUD STORAGE SERVICES

BACKGROUND

With the proliferation of personal computing devices such as desktop/laptop computers, personal digital assistants (PDAs), smartphones, tablets, and the like, many users have adopted cloud storage services to access their data across the various computing devices they use/own. Generally speaking, a cloud storage service enables a user to upload files to a cloud storage server for centralized storage in a remote storage location (i.e., in "the cloud"). Once the service has stored the files in the cloud, the user can download/synchronize the files from the cloud storage server to local storage on each of the user's computing devices.

For complete data privacy, some users encrypt and decrypt their cloud-stored data using security metadata that the users keep secret from the cloud storage service provider. For example, prior to uploading a particular file to the cloud storage server, a user can encrypt the file using a secret key at his/her computing device. Further, upon downloading the encrypted file from the cloud storage server, the user can decrypt the file using the same secret key at his/her computing device. With this approach, the cloud storage server never receives or otherwise has access to the user's secret key or unencrypted data; the cloud storage server only receives and stores the user's encrypted data. Thus, the user can keep his/her cloud-stored data completely private from the cloud storage service provider and other third parties. For instance, employees of the cloud storage service provider cannot view the content of the user's cloud-stored data. Further, if an authority compels the cloud storage service provider to supply the user's cloud-stored data to a third party (e.g., via a legal subpoena), the cloud storage service provider can only supply encrypted data, which the third party would be unable to read.

While the approach above has clear privacy benefits for users, it also complicates user access to cloud-stored data. For example, if a user employs a standard web browser to upload files to, and download files from, the cloud storage server, the user must generally encrypt the files manually prior to upload and decrypt the files manually subsequent to download. This can be a time-consuming and cumbersome process. As another example, if the user wishes to share a cloud-stored file with someone else via a public link to the cloud storage server, the user can only share the encrypted version of the file. This can be problematic if the intended recipient does not have access to the user's secret key. As yet another example, since the cloud storage server only stores encrypted data, the cloud storage service provider cannot provide value-added services that require the ability to read the unencrypted content of the user's files.

SUMMARY

In one embodiment, a method performed by a proxy for securing cloud-stored data is provided. The method includes receiving, by the proxy from a client node, a file to be stored by a cloud storage server, where the proxy and the client node are part of a private network that does not include the cloud storage server. The method further includes retrieving, by the proxy, an encryption key associated with a user of the client node and encrypting the file using the encryption key. The proxy then transmits the encrypted file to the cloud storage server.

The following detailed description and accompanying drawings provide a better understanding of the nature and advantages of particular embodiments.

DETAILED DESCRIPTION

In the following description, for purposes of explanation, numerous examples and details are set forth in order to provide an understanding of various embodiments. It will be evident, however, to one skilled in the art that certain embodiments can be practiced without some of these details, or can be practiced with modifications or equivalents thereof.

Certain embodiments provide a proxy (also referred to as a "crypto proxy") for securing data that is exchanged between one or more client nodes (e.g., user computing devices) and a cloud storage server. In one embodiment, the crypto proxy can automatically encrypt files that the crypto proxy receives from client nodes for upload to the cloud storage server, and automatically decrypt files that the crypto proxy retrieves from the cloud storage server in response to file access requests from the client nodes. The crypto proxy can also implement certain file services, such as thumbnail image generation, text indexing, file caching, public link sharing, and so on that facilitate user access to cloud-stored data. In a particular embodiment, a customer (e.g., a corporation) can deploy the crypto proxy within a private network (e.g., a corporate intranet) that includes the client nodes but excludes the cloud storage server. In this way, the customer can ensure that its users' data is kept completely private from the cloud storage service provider (and other third parties), since the cloud storage server provider cannot access the keys that the crypto proxy uses for encryption/decryption.

Figure 1:
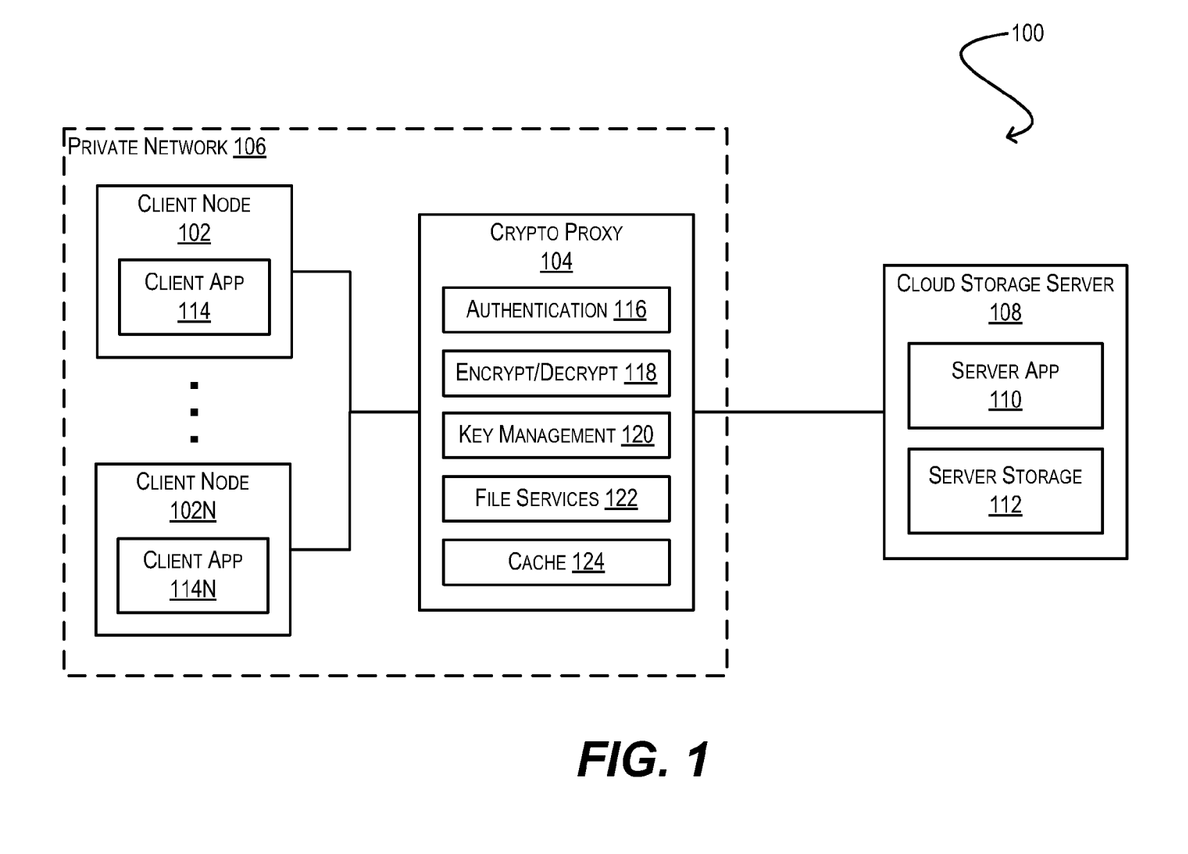
FIG. 1 illustrates a system environment according to one embodiment.

FIG. 1 illustrates a system environment 100 according to one embodiment. As shown, system environment 100 includes a number of client nodes 102-102N that are communicatively coupled with a crypto proxy 104. Crypto proxy 104 is, in turn, communicatively coupled with a cloud storage server 108. In the embodiment of FIG. 1, client nodes 102-102N and crypto proxy 104 are part of the same private network 106. For example, client nodes 102-102N and crypto proxy 104 can be part of the same corporate or organizational intranet. In contrast, cloud storage server 108 is not part of private network 106. For example, cloud storage server 108 can be separated from client nodes 102-102N and crypto proxy 104 via a network firewall (not shown). Although FIG. 1 depicts one crypto proxy and one cloud storage server, one of ordinary skill in the art will appreciate that alternative embodiments can include any number of these entities.

Cloud storage server 108 can be a computer system that provides cloud storage services to various clients such as client nodes 102-102N. As shown, cloud storage server 108 includes a server application (server app) 110 and server storage 112. Server application 110 can be implemented as a custom application or a web-based application, and can interact with client components (e.g., client applications (client apps) 114-114N) of client nodes 102-102N to enable various cloud storage management functions. For example, server application 110 can receive user files that are uploaded from client nodes 102-102N via client applications 114-114N and store the uploaded files in server storage 112 (thereby placing the files in "the cloud"). Server application 110 can also facilitate the downloading and/or synchronization of cloud-stored files to local storage components of client nodes 102-102N.

Server storage 112 can be implemented using any type or combination of data storage devices known in the art. Although FIG. 1 depicts server storage 112 as being part of cloud storage server 108, in alternative embodiments, a machine that is separate from cloud storage server 108 (e.g., a dedicated database server) can host server storage 112.

Client nodes 102-102N can be hardware and/or software-based entities that end-users can operate to access the cloud storage services exposed by cloud storage server 108. In one embodiment, client nodes 102-102N can include computing devices, such as a desktop computer, a laptop computer, a personal digital assistant (PDA), a smartphone, a tablet, or the like. In another embodiment, client nodes 102-102N can include virtual machines (VMs) running on one or more underlying physical computer systems (not shown).

As noted above, client nodes 102-102N can each include a client application (114-114N) that interacts with server application 110 to facilitate the management of cloud-stored data. In one embodiment, one or more of client applications 114-114N can be implemented as an operating system-native client. For example, if client node 102 is a desktop computer running, e.g., Microsoft Windows™, client application 114 can be a Windows program. As another example, if client node 102 is a smartphone or tablet running, e.g., Apple iOS™, client application 114 can be an iOS program. In further embodiments, one or more of client applications 114-114N can be implemented as a web-based client that executes in a standard web browser.

Crypto proxy 104 can be a hardware and/or software-based module that acts as an intermediary between clients 102-102N and cloud storage server 108. In one embodiment, crypto proxy 104 can be a physical device, such as a network appliance or a server computer system. Alternatively, like client nodes 102-102N, crypto proxy 104 can be a virtual machine (VM) running on one or more underlying physical computer systems (not shown).

Crypto proxy 104 can perform various functions for automatically securing the data that is transmitted between client nodes 102-102N and cloud storage server 108. For instance, crypto proxy 104 can receive, from one of client nodes 102-102N, a user request to upload a file to cloud storage server 108. In response, crypto proxy 104 can authenticate the request (via, e.g., authentication component 116), retrieve an encryption key associated with the user that originated the request (via, e.g., key management component 120), and encrypt the file using the encryption key (via, e.g., encrypt/decrypt component 118). Crypto proxy 104 can then send the encrypted file to cloud storage server 108 for storage in remote storage 112.

In another embodiment, crypto proxy 104 can receive, from one of client nodes 102-102N, a user request to download an encrypted file that is stored in remote storage 112. In response, crypto proxy 104 can authenticate the request (via, e.g., authentication component 116), retrieve a decryption key associated with the user that originated the request (via, e.g., key management component 120), retrieve the encrypted file from cloud storage server 108, and decrypt the file using the decryption key (via, e.g., encrypt/decrypt component 118). Crypto proxy 104 can then send the decrypted file to the requesting client node.

With the techniques above, crypto proxy 104 can handle all of the cryptographic duties that users at client nodes 102-102N previously performed for data privacy purposes. For example, users no longer need to encrypt their files at client nodes 102-102N prior to upload or decrypt their files at client nodes 102-102N after download; crypto proxy 104 can handle these tasks automatically and transparently. Thus, these techniques streamline the user experience of interacting with cloud storage server 108 while maintaining the privacy benefit of file encryption/decryption.

Further, since crypto proxy 104 resides within private network 106 (which excludes cloud storage server 108), crypto proxy 104 can keep the encryption/decryption keys secret from cloud storage server 108 and any other network entities that do not have access to private network 106. Accordingly, this ensures that the cloud storage service provider (and other third parties) cannot decrypt the users' cloud-stored files.

Crypto proxy 104 can also implement certain additional features that provide value to the users of client nodes 102-102N. For example, crypto proxy 104 can, prior to encrypting a file destined for upload to cloud storage server 108 or subsequently to decrypting a file retrieved from cloud storage server 108, process the file using one or more file services 122. This processing can include generating one or more thumbnail images of the file (if the file is, e.g., an image, video, document, etc.) and storing the thumbnail image(s) on crypto proxy 104. Crypto proxy 104 can then provide the stored thumbnail image(s) to client nodes 102-102N as a preview prior to downloading the full file from cloud storage server 108. The processing can further include generating indexing information for the file (if the file includes text) and storing the indexing information on crypto proxy 104. Crypto proxy 104 can then use the indexing information to perform full text searching of the file (and other text files stored by cloud storage server 108). These services are made possible by the fact that crypto proxy 104 has access to the unencrypted/decrypted versions of the users' cloud-stored files.

As another example, crypto proxy 104 can allow a user to share unencrypted versions of his/her cloud-stored files with others (even though the files are stored in an encrypted state in remote storage 112). In particular, crypto proxy 104 can generate a "public link" to a particular file that points to crypto proxy 104 (rather than to cloud storage server 108). The public link can be, e.g., a web URL. The owner of the file can then share the public link with an intended recipient (e.g., someone inside or outside of private network 106). When the recipient accesses the public link, crypto proxy 104 can retrieve the encrypted file from cloud storage server 108, decrypt the file using the appropriate decryption key, and send the decrypted file to the recipient. Thus, the file owner does not need to provide his/her decryption key to the recipient into order to share the file through the cloud storage service, and the recipient can easily download the shared file without having to deal with manually decrypting the file.

As yet another example, crypto proxy 104 can implement a cache 124 for accelerating the download of cloud-stored files. For instance, during the process of uploading a user file to cloud storage server 108, crypto proxy 104 can store the file (in either encrypted or unencrypted form) in cache 124. The next time a client node 102-102N requests download of the file, crypto proxy 104 can first check cache 124 to determine if the file is locally available. If so, crypto proxy 104 can retrieve the file directly from cache 124, decrypt the file (if encrypted), and send the file to the requesting client node. Thus, crypto proxy 104 does not need to retrieve the encrypted file from cloud storage server 108 or decrypt the encrypted file (if stored in unencrypted form in the cache). In certain embodiments, crypto proxy 104 can apply this cache processing to user flows other than a file downloading flow initiated via client nodes 102-102N. For example, crypto proxy 104 can check cache 124 as part of the public link sharing flow described above.

The foregoing and other aspects of crypto proxy 104 are described in further detail in the sections that follow.

Figure 2:
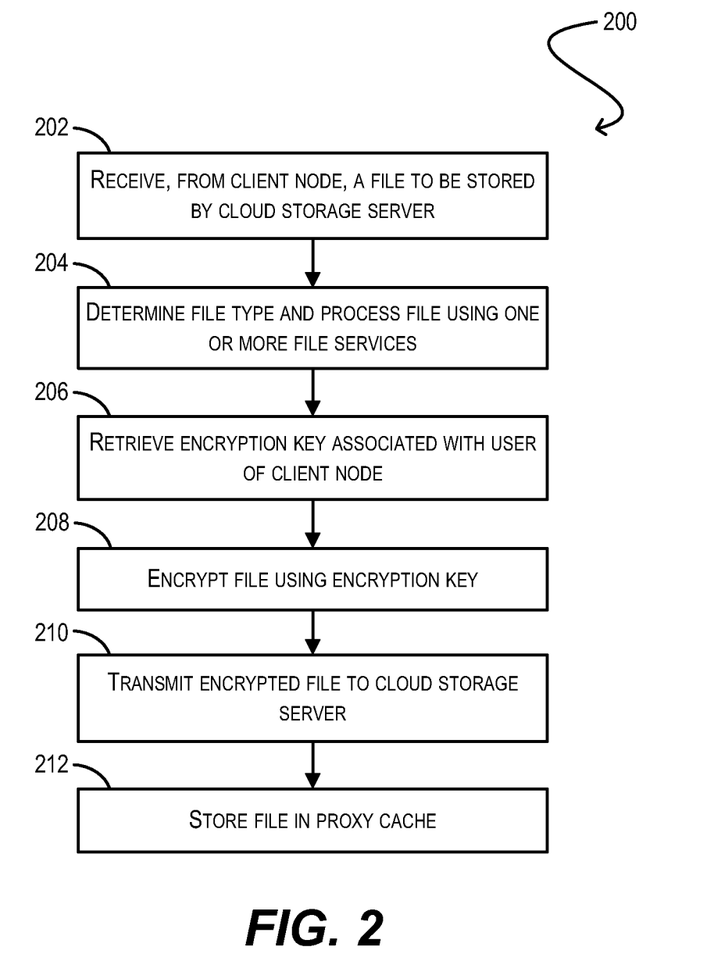
FIG. 2 illustrates a process performed by a crypto proxy for uploading files to a cloud storage server according to one embodiment.

FIG. 2 illustrates a process 200 that can be performed by crypto proxy 104 for uploading user files from client nodes 102-102N to cloud storage server 108 according to one embodiment. At block 202, crypto proxy 104 can receive, from one of client nodes 102-102N, a file that cloud storage server 108 should store. In one embodiment, crypto proxy 104 can further receive information identifying the user that is requesting the upload (e.g., a user ID and associated security credentials). Crypto proxy 104 can use this information to authenticate (via, e.g., authentication component 116) the user's identity (in order to retrieve the user's encryption key) and/or determine whether the user is authorized to upload the file to cloud storage server 108.

At block 204, crypto proxy 104 can determine the type of the file (e.g., image, video, text document, etc.) and then process the file based on the determined file type using one or more file services (e.g., file services 122. Such file services can include, e.g., thumbnail image generation, text indexing, and more. Example flows for these file services are described with respect to FIGS. 4 and 5 below.

At block 206, crypto proxy 104 can retrieve an encryption key associated with the user of the client node (i.e., the user that originated the upload request). In one embodiment, crypto proxy 104 can retrieve this encryption key from a key management component that is local to crypto proxy 104 (e.g., key management component 120). Alternatively, crypto proxy 104 can retrieve the encryption key from a separate key management server. In either case, an entity within private network 106 can maintain the encryption key (and thus the encryption key can be kept secret from cloud storage server 108 and other systems external to private network 106). In a particular embodiment, multiple users within private network 106 can share a single encryption key (rather than each user having a separate key).

Once crypto proxy 104 has retrieved the encryption key at block 206, crypto proxy 104 can encrypt the file using the encryption key (block 208) and transmit the encrypted file to cloud storage server 108 (block 210). Crypto proxy 104 can also store the file (in either encrypted or unencrypted form) in a cache that is local to crypto proxy 104 (e.g., cache 124). As explained in further detail below, crypto proxy 104 can use cache 124 to accelerate the download of cloud-stored files from cloud storage server 108 to requesting clients.

Figure 3:
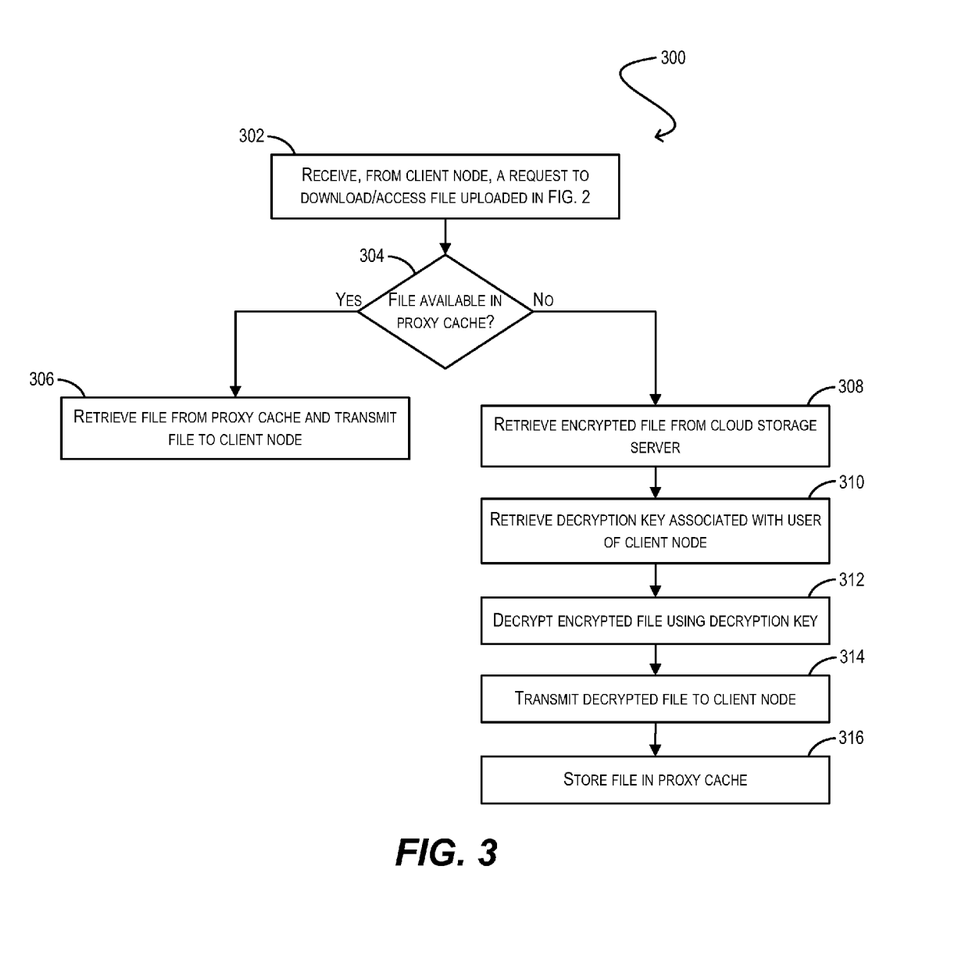
FIG. 3 illustrates a process performed by a crypto proxy for downloading files from a cloud storage server according to one embodiment.

FIG. 3 illustrates a process 300 that can be performed by crypto proxy 104 for downloading cloud-stored files from cloud storage server 108 to client nodes 102-102N according to one embodiment. At block 302, crypto proxy 104 can receive, from one of client nodes 102-102N, a request to download the file uploaded to cloud storage server 108 in FIG. 2. As part of this request, crypto proxy 104 can receive information identifying the user that is requesting the download (e.g., a user ID and associated security credentials). Crypto proxy 104 can use this information to authenticate (via, e.g., authentication component 116) the user's identity (in order to retrieve the user's decryption key) and/or determine whether the user is authorized to download the file from cloud storage server 108.

At block 304, crypto proxy 104 can determine whether it has stored the file locally in cache 124. If so, crypto proxy 104 can retrieve the file from cache 124, decrypt the file (if encrypted), and transmit the file to the client node (block 306), thereby satisfying the download request without having to perform a roundtrip to/from cloud storage server 108.

On the other hand, if crypto proxy 104 has not stored the file locally in cache 124, crypto proxy 104 can retrieve the encrypted file from cloud storage server 108 (block 308) and retrieve a decryption key associated with the user of the client node (i.e., the user that originated the download request) (block 310). Like the encryption key, crypto proxy 104 can retrieve this decryption key from local key management component 120 or a separate key management server that is part of private network 106. Crypto proxy 104 can then decrypt the encrypted file using the decryption key (block 312) and transmit the decrypted file to the client node (block 314). In addition, if the file is not already stored in cache 124, crypto proxy 104 can store the file (in either encrypted or decrypted form) in cache 124 (block 316).

As noted with respect to block 204 of FIG. 2, crypto proxy 104 can, as part of flow 200, process a file to be uploaded to cloud storage server 108 using one or more file services 122. File services 122 can provide value-added functionality to the users of client nodes 102-102N that make it easier and/or more efficient for the users to access and interact with their cloud-stored files.

In certain embodiments, file services 122 can include one or more "decryption-dependent" services that require access to the unencrypted/decrypted versions of user files. Examples of such decryption-dependent services include thumbnail image generation, text indexing, and so on. If these decryption-dependent services were executed on cloud storage server 108 (instead of crypto proxy 104), the users of client nodes 102-102N would not be able to keep their data completely private from the cloud storage service provider, since the decryption-dependent services (and thus cloud storage server 108) would need access to the users' unencrypted/decrypted files (and/or the users' decryption keys). By implementing these decryption-dependent services within the bounds of private network 106, crypto proxy 104 can allow the users of client nodes 102-102N to reap all of the benefit of these services without giving up or compromising on the security of their cloud-stored data.

Figure 4:
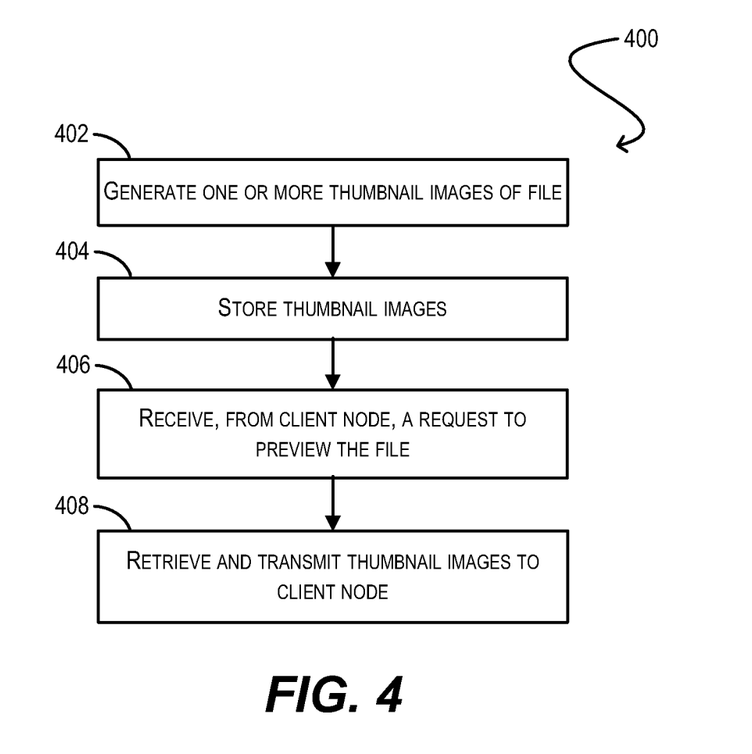
FIG. 4 illustrates a process performed by a crypto proxy for generating and providing a thumbnail image of a cloud-stored file according to one embodiment.
Figure 5:
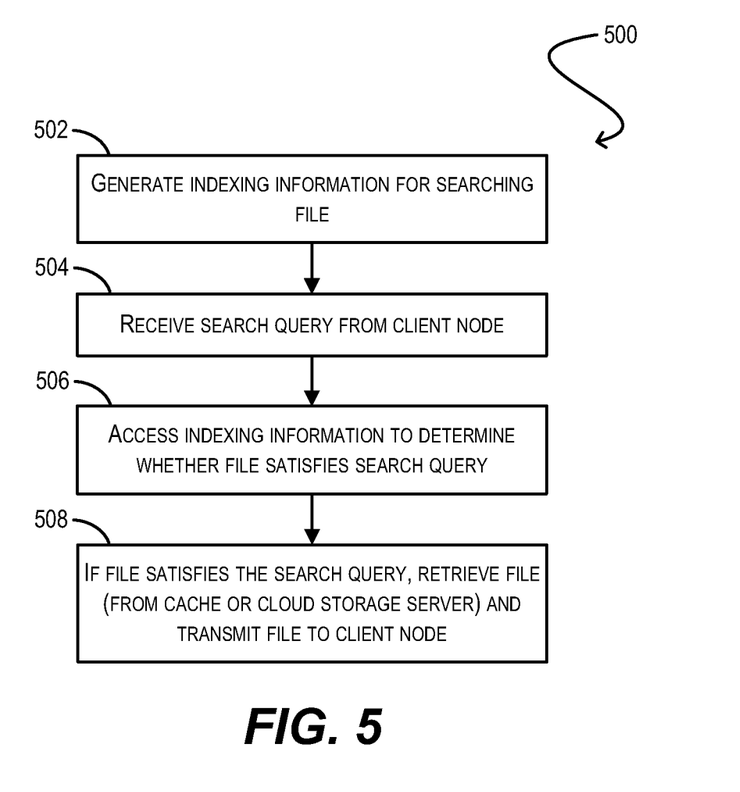
FIG. 5 illustrates a process performed by a crypto proxy for generating and using indexing information for a cloud-stored file according to one embodiment.

FIGS. 4 and 5 illustrate example flows that can be performed by crypto proxy 104 for applying decryption-dependent file services to a file to be uploaded to cloud storage server 108 according to various embodiments. In particular, FIG. 4 illustrates a process 400 for generating one or more thumbnail images for the file, and FIG. 5 illustrates a process 500 for generating text indexing information for the file. In certain embodiments, the execution of processes 400 and 500 can depend on the file type determined at block 204 of FIG. 2. For example, if the file is an image, video, or document, crypto proxy 104 can execute thumbnail image generation process 400. Alternatively or in addition, if the file includes text (e.g., a text document), crypto proxy 104 can execute text indexing process 500.

At block 402 of FIG. 4, crypto proxy 104 can generate one or more thumbnail images of the file to be uploaded to cloud storage server 108. For example, if the file is a multi-page document, crypto proxy 104 can generate one thumbnail image for each page of the document. As another example, if the file is a video, crypto proxy 104 can generate a single thumbnail image representing, e.g., the first frame of the video. Once generated, crypto proxy 104 can store the thumbnail image(s) in an accessible storage location (block 404). In one embodiment, crypto proxy 104 can store the thumbnail image(s) in cache 124. In another embodiment, crypto proxy 104 can store the thumbnail images in an alternative memory pool or device.

At block 406, crypto proxy 104 can receive, from one of client nodes 102-102N, a request to preview the file. For example, the user of the client node may be interested in viewing previews of all of his/her image files stored by cloud storage server 108 in order to determine which full-sized images should be downloaded to the user's computing device. In response, at block 408, crypto proxy 104 can retrieve the thumbnail image(s) of the file stored at block 404 and transmit the thumbnail image(s) to the client node.

Turning now to indexing process 500 of FIG. 5, at block 502, crypto proxy 104 can generate indexing information for a file to be uploaded to cloud storage server 108. The indexing information can include, e.g., data that allows crypto proxy 104 to quickly determine whether a given word or phrase is included in the file. Like the thumbnail images generated in FIG. 4, crypto proxy 104 can store the indexing information locally.

At block 504, crypto proxy 104 can receive, from one of client nodes 102-102N, a search query for searching the files stored by cloud storage server 108. In response, crypto proxy 104 can access the indexing information generated at block 504 to determine whether the file satisfies the search query (i.e., if the word(s) or phrase(s) being searched for are included in the file) (block 506). If so, crypto proxy 104 can retrieve the file (using substantially the same flow shown at blocks 304-314 of FIG. 3) and transmit the file to the client node (block 508). Alternatively, crypto proxy 104 can transmit metadata for the file (e.g., filename, owner, last updated date, etc.) to the client node.

Figure 6:
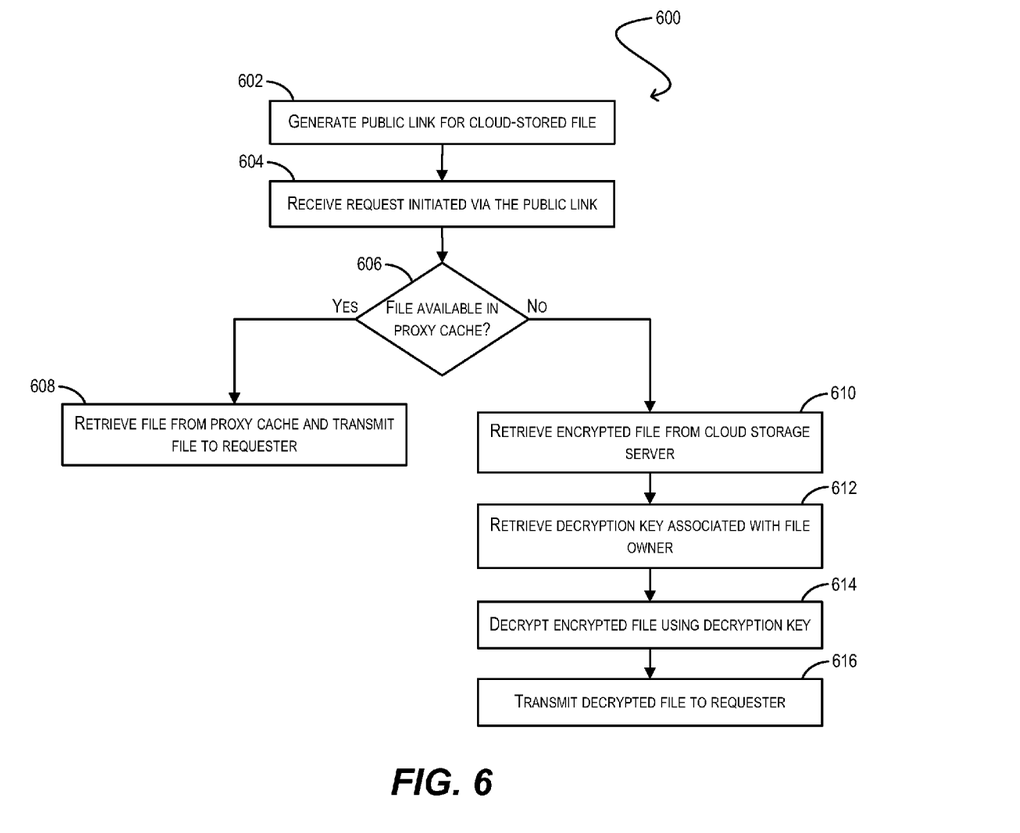
FIG. 6 illustrates a process performed by a crypto proxy for generating and processing a public link to a cloud-stored file according to one embodiment.

In addition to the thumbnail image generation and text indexing shown in FIGS. 4 and 5, crypto proxy 104 can also enable a user to share unencrypted versions of his/her cloud-stored files via public links (even though the files are stored in an encrypted state in remote storage 112). FIG. 6 illustrates a process 600 for implementing this public link functionality according to one embodiment.

At block 602, crypto proxy 104 can generate a public link for a file stored in remote storage 112 of cloud storage server 108. For example, crypto proxy 104 can generate the public link in response to a request from the owner of the file who wishes to publically share the file with someone inside or outside of private network 106. As noted previously, this public link can point to crypto proxy 104 (rather than cloud storage server 108), and can include information identifying the file being shared. In a particular embodiment, the public link can be a web (i.e., HTTP) URL. Once crypto proxy 104 has generated the public link, the requesting user can provide the public link to the intended recipient.

At block 604, crypto proxy 104 can receive a request from the recipient as a result of accessing the public link. In response, crypto proxy 104 can determine whether the public link is valid (e.g., corresponds to a public link that crypto proxy 104 previously generated). If so, crypto proxy 104 can automatically retrieve the file referenced in the public link (either from proxy 124 or cloud storage server 108), decrypt the file if necessary, and then provide the unencrypted/decrypted file to the recipient (blocks 606-616). In this manner, the file owner does not need to provide his/her decryption key to the recipient, and the recipient can easily download the shared file without having to manually decrypt the file.

In one embodiment, the processing crypto proxy 104 performs at blocks 606-616 can be substantially similar to blocks 304-314 of FIG. 3. For example, at block 606, crypto proxy 104 can determine whether the file is locally available in cache 124. If so, crypto proxy 104 can retrieve the file from cache 124, decrypt the file (if encrypted), and transmit the file to the recipient (block 608).

On the other hand, if the file is not locally available in cache 124, crypto proxy 104 can retrieve the encrypted file from cloud storage server 108 (block 610) and retrieve a decryption key associated with the file owner (block 612). Crypto proxy 104 can then decrypt the encrypted file using the decryption key (block 614) and transmit the decrypted file to the recipient (block 614).

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments may be useful machine operations. In addition, one or more embodiments also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations. The various embodiments described herein may be practiced with other computer system configurations including hand-held devices, microprocessor systems, microprocessor-based or programmable consumer electronics, minicomputers, mainframe computers, and the like.

One or more embodiments may be implemented as one or more computer programs or as one or more computer program modules embodied in one or more non-transitory computer readable storage media. The term non-transitory computer readable storage medium refers to any data storage device that can store data which can thereafter be input to a computer system. The non-transitory computer readable media may be based on any existing or subsequently developed technology for embodying computer programs in a manner that enables them to be read by a computer. Examples of a non-transitory computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The non-transitory computer readable medium can also be distributed over a network coupled computer system so that the computer readable code is stored and executed in a distributed fashion.

Boundaries between various components, operations and data stores described herein are somewhat arbitrary, and particular operations are illustrated in the context of specific illustrative configurations. Other allocations of functionality are envisioned and may fall within the scope of the invention (s). In general, structures and functionality presented as separate components in exemplary configurations may be implemented as a combined structure or component. Similarly, structures and functionality presented as a single component may be implemented as separate components.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented. The above examples and embodiments should not be deemed to be the only embodiments, and are presented to illustrate the flexibility and advantages of particular embodiments as defined by the following claims. Based on the above disclosure and the following claims, other arrangements, embodiments, implementations and equivalents may be employed without departing from the scope hereof as defined by the claims.

What is claimed is:

1. A computer implemented method comprising:
    receiving, by a proxy from a first client node, a file to be stored by a cloud storage server, the proxy and the client node being part of a private network that does not include the cloud storage server;
    retrieving, by the proxy, an encryption key associated with a user of a client node;
    encrypting, by the proxy, the file using the encryption key;
    transmitting, by the proxy, the encrypted file to the cloud storage server;
    generating, by the proxy, a public link for accessing the file, wherein the public link includes a unique identifier for the file and points to an address of the proxy, and wherein the public link is provided by the first user of the first client node to a second user of a second client node;
    receiving, by the proxy from said second client node, a request to access the file, the request being initiated via the public link;
    verifying, by the proxy upon receiving the request, that the public link was previously generated by the proxy; and
    in response to the verifying, if a copy of the file is not locally available on the proxy:
        retrieving, by the proxy, the encrypted file from the cloud storage server;
        retrieving, by the proxy, a decryption key associated with the first user;
        decrypting, by the proxy, the encrypted file using the decryption key; and
        transmitting, by the proxy, the decrypted file to said second client node.

2. The method of claim 1 wherein the encryption key and the decryption key are maintained by the proxy.

3. The method of claim 1 wherein the encryption key and the decryption key are maintained by a server system that is separate from the proxy.

4. The method of claim 1 further comprising, prior to the encrypting:
    determining a type of the file; and
    based on the type, processing the file using one of a plurality of file services.

5. The method of claim 4 wherein processing the file comprises generating a thumbnail image of the file.

6. The method of claim 5 further comprising:
    receiving, from the client node, a request to preview the file; and
    in response to the request, transmitting the thumbnail image to the client node.

7. The method of claim 4 wherein the type of the file is a text document, and wherein processing the file comprises generating indexing information for searching the file.

8. The method of claim 7 further comprising:
    receiving, from the client node, a search query;
    in response to the search query, accessing the indexing information to determine whether the file satisfies the search query; and
    if the file satisfies the search query, transmitting the file to the client node.

9. The method of claim 1 further comprising storing a copy of the file in a proxy cache.

10. The method of claim 9 further comprising:
    receiving, from the client node, a request to access the file;
    in response to the request, retrieving the copy of the file from the proxy cache; and
    transmitting the copy of the file to the client node.

11. The method of claim 1 wherein the proxy is a virtual machine executing on one or more physical computer systems.

12. The method of claim 1 further comprising:
    if a copy of the file is locally available on the proxy, transmitting the copy of the file to said another client node, without accessing the cloud storage server.

13. The method of claim 1 wherein said another client node is not part of the private network.

14. A non-transitory machine readable storage medium embodying computer software, the computer software causing a proxy to perform a method, the method comprising:
    receiving, from a first client node, a file to be stored by a cloud storage server, the proxy and the client node being part of a private network that does not include the cloud storage server;
    retrieving an encryption key associated with a user of the client node;
    encrypting the file using the encryption key;
    transmitting the encrypted file to the cloud storage server;
    generating a public link for accessing the file, wherein the public link includes a unique identifier for the file and points to an address of the proxy, and wherein the public link is provided by the first user of the first client node to a second user of a second client node;
    receiving from said second client node, a request to access the file, the request being initiated via the public link;
    verifying upon receiving the request, that the public link was previously generated by the proxy;
    in response to the verifying, if a copy of the file is not locally available on the proxy:
        retrieving the encrypted file from the cloud storage server;
        retrieving a decryption key associated with the first user;
        decrypting the encrypted file using the decryption key; and
        transmitting the decrypted file to said second client node.

15. The non-transitory computer readable storage medium of claim 14 wherein the method further comprises:
    determining a type of the file; and
    processing the file based on the type prior to the encrypting using one of a plurality of file services.

16. The non-transitory machine readable storage medium of claim 14 wherein the method further comprises:

if a copy of the file is locally available on the proxy, transmitting the copy of the file to said another client node, without accessing the cloud storage server.

17. The non-transitory machine readable storage medium of claim 14 wherein said another client node is not part of the private network.

18. A Proxy comprising:
a memory; and
one or more processors configured to:
receive from a first client node, a file to be stored by a cloud storage server, the apparatus and the client node being part of a private network that does not include the cloud storage server;
retrieve an encryption key associated with a user of the client node;
encrypt the file using the encryption key;
transmit the encrypted file to the cloud storage server;
generate a public link for accessing the file, wherein the public link includes a unique identifier for the file and points to an address of the proxy, and wherein the public link is provided by the first user of the first client node to a second user of a second client node;
receive from said second client node, a request to access the file, the request being initiated via the public link;
verify upon receiving the request, that the public link was previously generated by the proxy; and
in response to the verifying, if a copy of the file is not locally available on the apparatus:
retrieve the encrypted file from the cloud storage server;
retrieve a decryption key associated with the first user;
decrypt the encrypted file using the decryption key; and
transmit the file to said second client node.

19. The proxy of claim 18 wherein the processor is further configured to: determine a type of the file; and based on the type, process the file prior to the encrypting using one of a plurality of file services.

20. The proxy of claim 18 wherein the one or more processors are further configured to: if a copy of the file is locally available on the apparatus, transmit the copy of the file to said another client node, without accessing the cloud storage server.

21. The proxy of claim 18 wherein said another client node is not part of the private network.

* * * * *